United States Patent
Wagner

(10) Patent No.: US 8,346,821 B2
(45) Date of Patent: Jan. 1, 2013

(54) ORPHAN OBJECT TRACKING FOR OBJECTS HAVING ACQUIRE-RELEASE SEMANTICS

(75) Inventor: Ben Wagner, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 250 days.

(21) Appl. No.: 12/775,998

(22) Filed: May 7, 2010

(65) Prior Publication Data
US 2011/0276984 A1 Nov. 10, 2011

(51) Int. Cl.
*G06F 12/00* (2006.01)
(52) U.S. Cl. ........................................ 707/813
(58) Field of Classification Search ............... None
See application file for complete search history.

(56) References Cited

U.S. PATENT DOCUMENTS

| | | | |
|---|---|---|---|
| 6,363,403 B1* | 3/2002 | Roy et al. ............................ 1/1 |
| 6,735,760 B1* | 5/2004 | Dice ............................ 717/139 |
| 6,874,074 B1* | 3/2005 | Burton et al. ............ 711/170 |
| 7,421,680 B2* | 9/2008 | DeLine et al. ............ 717/126 |
| 7,584,232 B2* | 9/2009 | Guo ............................ 1/1 |
| 7,653,793 B1* | 1/2010 | Garthwaite ............ 711/159 |
| 2008/0162886 A1* | 7/2008 | Saha et al. ............ 712/214 |

* cited by examiner

*Primary Examiner* — Belinda Xue
(74) *Attorney, Agent, or Firm* — Steven M. Greenberg, Esq.; Cary, Rodriguez, Greenberg & O'Keefe

(57) ABSTRACT

A method for object tracking of resource objects with acquire and release semantics can include instrumenting both an acquisition method and a release method of a resource object to write a reference to the resource object to an open object set upon acquiring the resource object, and to remove the reference to the resource object in the open object set upon releasing the resource object. The method also can include determining whether the resource object both has been flagged for garbage collection in the virtual machine and also remains referenced in the open object set. Finally, the method can include generating an error record in the virtual machine responsive to determining the resource object to have been both flagged for garbage collection in the virtual machine and also remaining referenced in the open object set.

5 Claims, 2 Drawing Sheets

ORPHAN OBJECT TRACKING FOR OBJECTS HAVING ACQUIRE-RELEASE SEMANTICS

BACKGROUND OF THE INVENTION

1. Field of the Invention

The present invention relates to memory management and more particularly to object lifecycle management and improper object usage for objects having acquire-release semantics.

2. Description of the Related Art

Memory leakage has confounded software developers for decades resulting in the sometimes global distribution of bug-ridden, crash-prone software applications. Particularly in respect to those programming languages which permitted the manual allocation of memory, but also required the manual de-allocation of allocated memory, memory leakage has proven to be the principal run-time bug most addressed during the software development cycle. So prevalent a problem has memory leakage become, entire software development tools have been developed and marketed solely to address the memory leakage problem.

Memory leakage, broadly defined, is the gradual loss of allocable memory due to the failure to de-allocate previously allocated, but no longer utilized memory. Typically, memory can be reserved for data having a brief lifespan. Once the lifespan has completed, the reserved memory ought to be returned to the pool of allocable memory so that the reserved memory can be used at a subsequent time as necessary. Importantly, where memory leakage persists without remediation, ultimately not enough memory will remain to accommodate the needs of other processes.

Recognizing the importance of addressing the memory leakage problem, computer programming language theorists have developed the notion of garbage collection. Garbage collection refers to the automated analysis of allocated memory to identify regions of allocated memory containing data which no longer are required for the operation of associated processes. In the context of object oriented programming languages such as the Java™ programming language, when objects residing in memory are no longer accessible within a corresponding application, the memory allocated to the "dead" object can be returned to the pool of allocable memory.

While garbage collection can be effective in detecting orphaned objects in memory, garbage collection in the Java programming language does not account for the acquisition of other types of resources and the subsequent failure to release acquired resources. In this regard, while a resource object such as those requiring the acquisition of a file handle can be acquired within a resource object, the failure to properly release the file handle prior to the destruction of the resource object can result in the creation of an orphan file handle. The orphanage of file handles ultimately can result in the unwitting exhaustion of available file handles. To detect the unwitting orphanage of a resource object having acquire-release semantics, the resource object must be instrumented to report the occurrence of the acquisition and the release. The instrumentation of the resource object, however, can be inefficient and intrusive. Thus, developers seldom do so resulting in the failure to detect the misuse of resource objects.

BRIEF SUMMARY OF THE INVENTION

Embodiments of the present invention address deficiencies of the art in respect to managing the use of a resource object with acquire and release semantics and provide a novel and non-obvious method, system and computer program product for orphan object tracking for resource objects having acquire and release semantics. In an embodiment of the invention, a method for object tracking of resource objects with acquire and release semantics can include instrumenting both an acquisition method and a release method of a resource object to write a reference to the resource object to an open object set upon acquiring the resource object, and to remove the reference to the resource object in the open object set upon releasing the resource object. The method also can include determining whether the resource object both has been flagged for garbage collection in the virtual machine and also remains referenced in the open object set. Finally, the method can include generating an error record in the virtual machine responsive to determining the resource object to have been both flagged for garbage collection in the virtual machine and also remaining referenced in the open object set.

In another embodiment of the invention, an object tracking data processing system can be configured for object tracking of resource objects with acquire and release semantics. The system a host computer with at least one processor and memory, a virtual machine executing in the memory of the host computer, and a classloader and a garbage collector disposed in the virtual machine. The system also can include an open object tracker agent registered with the virtual machine. The agent can include program code enabled to instrument both an acquisition method and a release method of a resource object passed to the agent by the classloader to write a reference to the resource object to an open object set in the virtual machine upon acquiring the resource object, and to remove the reference to the resource object in the open object set upon releasing the resource object, to determine whether the resource object both has been flagged for garbage collection by the garbage collector and also remains referenced in the open object set, and to generate an error record responsive to determining the resource object having been both flagged for garbage collection and also remaining referenced in the open object set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for object tracking of resource objects with acquire and release semantics. In accordance with an embodiment of the invention, resource objects of interest can be written to a configuration file. Thereafter, upon an attempt to load any resource object in the configuration file, the acquisition and release methods of the resource object can be rewritten to incorporate code requisite to record a reference to the resource object in a listing of open objects upon acquisition, and to remove reference to the resource object in the listing of open objects upon release of the resource object. To the extent that a garbage collector detects collection of the resource object and reference to the resource object remains in the object set, indicating an orphaned resource object, an error record can be written in respect to the orphaned resource object. In this way, the misuse of the resource object can be detected without requiring the tedious manual instrumentation of the resource object.

Figure 1:
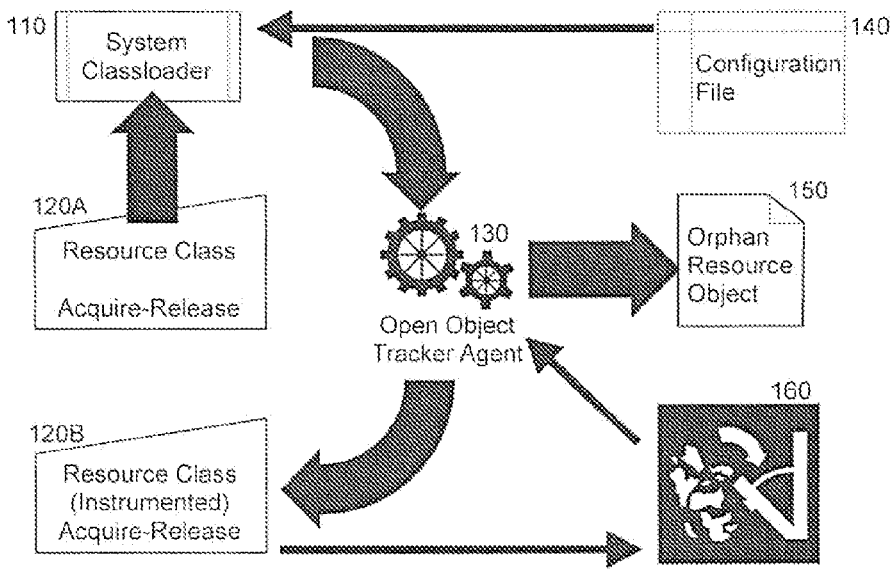
FIG. 1 is a pictorial illustration of a process for object tracking of resource objects with acquire and release semantics.

In further illustration, FIG. 1 pictorially shows a process for object tracking of resource objects with acquire and release semantics. As shown in FIG. 1, a system classloader 110 for a virtual machine can load a resource object 120A with acquire and release semantics. An open object tracker agent 130 registered with the virtual machine can refer to a configuration file 140 to determine whether or not the resource object 120A is an object of interest. If so, the open object tracker agent 130 can rewrite the acquisition and release methods of the resource object 120A into an instrumented resource object 120B. The open object tracker agent 130 in turn can return the instrumented resource object 120B to the classloader for loading into execution in the virtual machine.

Once executed, the instrumented resource object 120B can write a record to an open object set to indicating the acquisition of the instrumented resource object 120B. Likewise, upon release of the instrumented resource object 120B, the instrumented resource object 120B can remove reference to the instrumented resource object 120B in the object set. However, should the instrumented resource object 120B become garbage collected by garbage collector 160 before reference to the instrumented resource object 120B can be removed from the object set (indicating that the release method had not been invoked), the instrumented resource object 120B can be deemed orphaned and an error record 150 can be generated by the open object tracker agent 130.

Figure 2:
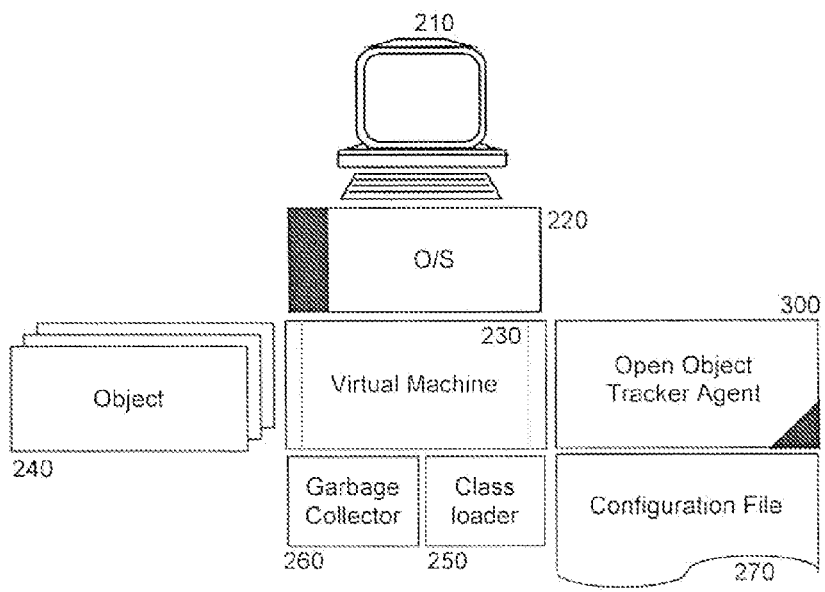
FIG. 2 is a schematic illustration of an object tracking data processing system configured for object tracking of resource objects with acquire and release semantics.

The process described in connection with FIG. 1 can be implemented in an object tracking data processing system. In yet further illustration, FIG. 2 schematically depicts an object tracking data processing system configured for object tracking of resource objects with acquire and release semantics. The system can include a host computer 210 with at least one processor and memory. An operating system 220 can execute in the memory by at least one processor of the host computer 210. The operating system 230 further can host a virtual machine 230 in which one or more objects 240 can be interpreted and/or executed. The virtual machine 230 also can include a classloader 250 and garbage collector 260.

Of note, an open object tracker agent 300 can be coupled to the virtual machine 230. The agent 300 can include program code that when interpreted and/or executed in the virtual machine 230 can be operable to interact with the classloader 250 upon loading a resource object amongst the objects 240 to determine whether the resource object is listed in configuration file 270. If so, the resource object can be rewritten to instrument the acquisition method with code sufficient to write a record to an open object set referencing the resource object, and to instrument the release method with code sufficient to remove the record in the open object set referencing the resource object. The program code of the agent 300 further can be enabled to query the garbage collector 260 to determine whether or not a resource object has been flagged for garbage collection. If so, the program code of agent 300 can be enabled to determine whether reference remains in the open object set to the flagged resource object resulting in an orphaned resource object. If so, the program code of the agent 300 can write an error record referencing the orphaned resource object.

Figure 3:
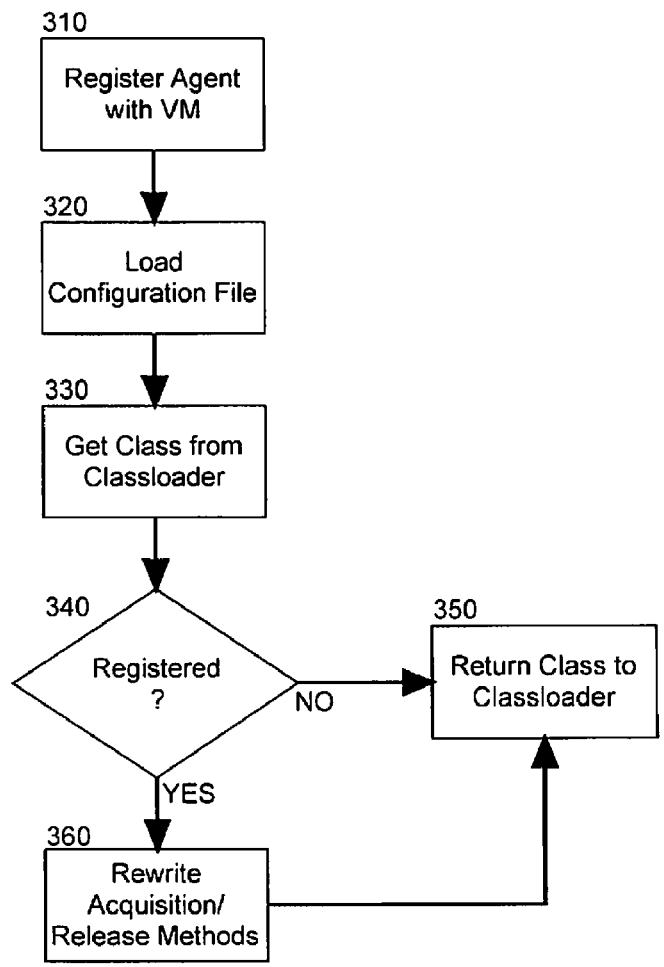
FIG. 3 is a flow chart illustrating a process for object tracking of resource objects with acquire and release semantics in the system of FIG. 2; and, FIG. 4 is a block diagram illustrating a process for detecting an orphaned resource object in the system of FIG. 2.

In even yet further illustration of the operation of the agent 300, FIG. 3 is a flow chart illustrating a process for object tracking of resource objects with acquire and release semantics in the system of FIG. 2. Beginning in block 310, the agent can be registered with the virtual machine. In block 320, a configuration of resource objects of interest can be loaded. In block 330, a resource object can be received from a classloader of the virtual machine. In decision block 340, it can be determined whether or not the resource object is listed in the configuration file. If not, in block 350 the resource object can be returned to the classloader for loading unmodified. Otherwise, in block 360 acquisition and release methods of the resource object can be instrumented and the modified resource object can be returned to the classloader.

Figure 4:
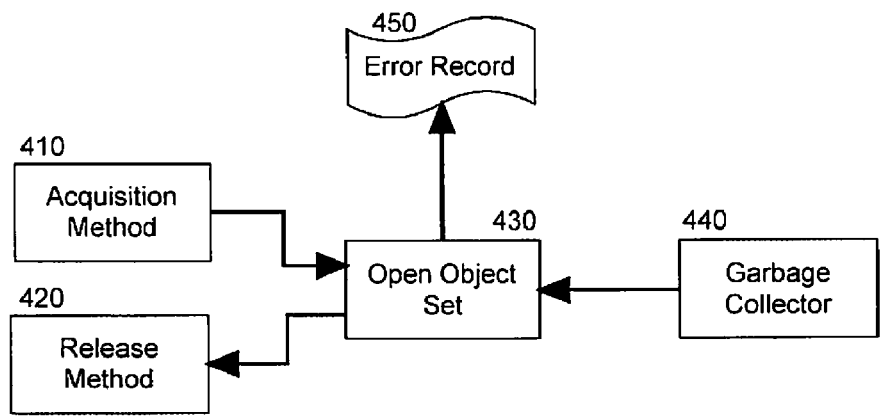

In this regard, referring to FIG. 4, the acquisition method 410 of the resource object can be instrumented to write a referencing record to an open object set 430 upon acquisition of the resource object from the time when the acquisition method has been called. For example, the referencing record can include a full stack trace from the time when the acquisition method has been called. Similarly, the release method 420 of the resource object can be instrumented, such as through byte code modification (re-writing) to remove a referencing record in the open object set 430 upon release of the resource object. When the garbage collector 440 indicates the flagging of the resource object as a garbage collection candidate, it can be determined whether or not reference remains to the resource object in the object set 430. If so, an error record 450 can be generated indicating that the resource object has been orphaned.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. An object tracking data processing system configured for object tracking of resource objects with acquire and release semantics, the system comprising:
   a host computer with at least one processor and memory;
   a virtual machine executing in the memory of the host computer;
   a classloader and a garbage collector disposed in the virtual machine; and, an open object tracker agent registered with the virtual machine and comprising program code enabled to instrument both an acquisition method and a release method of a resource object passed to the agent by the classloader to write a reference to the resource object to an open object set in the virtual machine upon acquiring the resource object from a time when the acquisition method is called, and to remove the reference to the resource object in the open object set upon releasing the resource object, to determine whether the resource object both has been flagged for garbage collection by the garbage collector and also remains referenced in the open object set, and to generate an error record responsive to determining the resource object having been both flagged for garbage collection and also remaining referenced in the open object set.

2. A computer program product comprising a computer usable storage medium storing computer usable program code for object tracking of resource objects with acquire and release semantics, the computer program product comprising:

- computer usable program code for instrumenting in an agent executing in a virtual machine in memory by a processor of a computer, both an acquisition method and a release method of a resource object to write a reference to the resource object to an open object set upon acquiring the resource object from a time when the acquisition method is called, and to remove the reference to the resource object in the open object set upon releasing the resource object;
- computer usable program code for determining whether the resource object both has been flagged for garbage collection in the virtual machine and also remains referenced in the open object set; and,
- computer usable program code for generating an error record in the virtual machine responsive to determining the resource object to have been both flagged for garbage collection in the virtual machine and also remaining referenced in the open object set.

3. The computer program product of claim 2, further comprising computer usable program code for registering the agent with the virtual machine.

4. The computer program product of claim 2, wherein the computer usable program code for instrumenting both an acquisition method and a release method of a resource object to write a reference to the resource object to an open object set upon acquiring the resource object, and to remove the reference to the resource object in the open object set upon releasing the resource object, comprises computer usable program code for byte code modifying the resource object to write a reference to the resource object to an open object set upon acquiring the resource object, and to remove the reference to the resource object in the open object set upon releasing the resource object.

5. The computer program product of claim 2, further comprising:

- computer usable program code for loading a configuration file comprising a plurality of references to different resource objects;
- computer usable program code for determining whether a resource object passed by a classloader to the agent is referenced in the configuration file; and,
- computer usable program code for performing the instrumenting of the resource object only if the resource object passed by the classloader to the agent is referenced in the configuration file.

* * * * *